United States Patent
Chou et al.

(10) Patent No.: US 8,369,241 B2
(45) Date of Patent: *Feb. 5, 2013

(54) FAST FEEDBACK CONTENTION-BASED RANGING PROCEDURE IN WIRELESS COMMUNICATIONS SYSTEMS

(75) Inventors: Chao-Chin Chou, Taipei (TW); Yih-Shen Chen, Hsinchu (TW); I-Kang Fu, Dashe Township, Kaohsiung County (TW)

(73) Assignee: Mediatek Inc. (TW)

( * ) Notice: Subject to any disclaimer, the term of this patent is extended or adjusted under 35 U.S.C. 154(b) by 277 days.

This patent is subject to a terminal disclaimer.

(21) Appl. No.: 12/387,380

(22) Filed: Apr. 30, 2009

(65) Prior Publication Data

US 2009/0274041 A1 Nov. 5, 2009

Related U.S. Application Data

(60) Provisional application No. 61/050,280, filed on May 5, 2008.

(51) Int. Cl.
*H04B 7/216* (2006.01)
(52) U.S. Cl. ......... 370/254; 370/312; 370/335; 370/342
(58) Field of Classification Search .................. None
See application file for complete search history.

(56) References Cited

U.S. PATENT DOCUMENTS

| | | | | |
|---|---|---|---|---|
| 6,215,792 | B1 | 4/2001 | Abi-Nassif | 370/458 |
| 6,418,494 | B1 * | 7/2002 | Shatas et al. | 710/305 |
| 7,599,341 | B2 * | 10/2009 | Ramachandran | 370/338 |
| 2005/0101328 | A1 | 5/2005 | Son et al. | 455/436 |
| 2006/0203712 | A1 * | 9/2006 | Lim et al. | 370/208 |
| 2007/0104177 | A1 | 5/2007 | Hwang et al. | 370/348 |
| 2007/0189239 | A1 | 8/2007 | Lim et al. | 370/337 |
| 2008/0159334 | A1 * | 7/2008 | Venkatachalam et al. | 370/479 |
| 2008/0159427 | A1 * | 7/2008 | Kang et al. | 375/260 |
| 2009/0129404 | A1 * | 5/2009 | Wu et al. | 370/468 |

FOREIGN PATENT DOCUMENTS

| | | | |
|---|---|---|---|
| EP | 1760980 A1 | | 9/2005 |
| EP | 1898561 A1 | | 9/2006 |
| EP | 1742501 A1 | * | 10/2007 |
| JP | 2006254461 A | | 9/2006 |

(Continued)

OTHER PUBLICATIONS

International Search Report and Written Opinion of International Search Authority for PCT/CN2009/071643 dated Aug. 13, 2009 (9 pages).

(Continued)

*Primary Examiner* — Chirag Shah
*Assistant Examiner* — Jenkey Van
(74) *Attorney, Agent, or Firm* — Imperium Patent Works; Zheng Jin (57) ABSTRACT

A fast feedback mechanism is provided in a contention-based ranging procedure. A Subscriber Station (SS) initializes a ranging procedure by sending a ranging code on a selected ranging opportunity for resource access to a Base Station (BS) on a shared ranging channel in a previous uplink frame. The SS also starts a time associated with the ranging code. In response to all received ranging opportunities, the BS broadcasts an acknowledgement (ACK) in a subsequent downlink frame. The ACK comprises a reception status message that indicates the decoding status of the ranging opportunities. With the novel fast feedback mechanism, when ranging collision or failure occurs, upon receiving the reception status report, the SS will proceed with the next round of contention without continuing wait for the entire timeout period. As a result, the total latency due to the ranging collision or failure is reduced.

29 Claims, 12 Drawing Sheets

FOREIGN PATENT DOCUMENTS

JP  2008104096 A  5/2008

OTHER PUBLICATIONS

JP Office Action and Translation, for JP patent application 2011-507780, dated on Jul. 11, 2012 (5 pages).

Office Action for U.S. Appl. No. 12/655,835, dated on Jun. 12, 2012 (15 pages).

Taiwan Intellectual Property office has prepared the Search Report of Taiwan patent application 098114677 (1 page).

* cited by examiner (Prior Art)
FIG. 1

(Prior Art)
FIG. 2

(Prior Art)

FIG. 3

(Prior Art)

FIG. 4

(Prior Art)

FIG. 5

(Prior Art)

FIG. 6

| PRIORITY | GRANT SCHEDULING TYPE | CONTENTION BASED TIMEOUT (MS) |
|---|---|---|
| HIGH | rtPS | 50 |
| HIGH | ertPS | 50 |
| LOW | nrtPS | 100 |
| LOW | BE | 100 |

(Prior Art)

FAST FEEDBACK CONTENTION-BASED RANGING PROCEDURE IN WIRELESS COMMUNICATIONS SYSTEMS

CROSS REFERENCE TO RELATED APPLICATIONS

This application claims priority under 35 U.S.C. §119 from U.S. Provisional Application No. 61/050,280, entitled "Collision Detection and Fast Feedback for Contention-based OFDMA Ranging," filed on May 5, 2008, the subject matter of which is incorporated herein by reference.

TECHNICAL FIELD

The disclosed embodiments relate generally to wireless network communications, and, more particularly, to contention-based ranging procedure.

BACKGROUND

Figure 1:
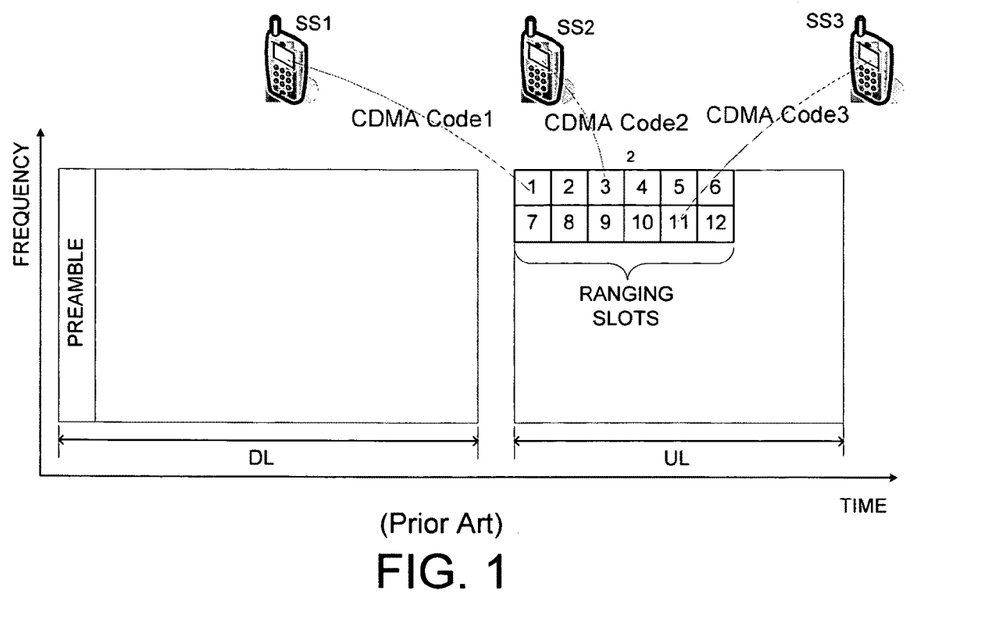
FIG. 1 (Prior Art) and FIG. 2 (Prior Art) illustrate a conventional contention-based CDMA ranging procedure.

FIG. 1 (Prior Art) illustrates a contention-based CDMA ranging procedure. As illustrated in FIG. 1, in a CDMA ranging procedure, each Subscriber Stations (SS) randomly selects a CDMA ranging code from a predefined code pool, and transmits the ranging code to a Base Station (BS) via a randomly selected ranging slot from a limited number of ranging slots on a shared ranging channel provided by the BS. In the example of FIG. 1, SS1 transmits a CDMA Code sequence, indexed by CDMA Code1, on ranging slot 1, SS2 transmits a CDMA Code sequence, indexed by CDMA Code2, on ranging slot 3, and SS3 transmits a CDMA Code sequence, indexed by CDMA Code3, on ranging slot 11.

Figure 2:
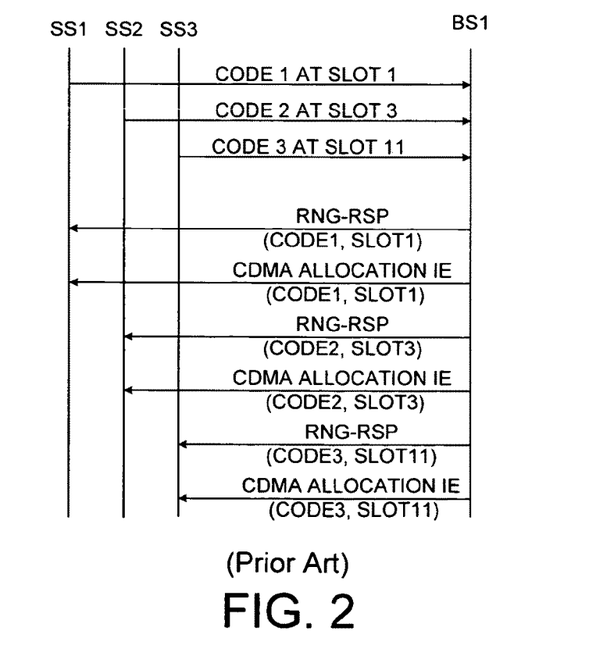

FIG. 2 (Prior Art) is a conventional message sequence diagram corresponding to the CDMA ranging procedure in FIG. 1. As illustrated in FIG. 2, after successful detection of the ranging codes, Base Station BS1 responses with ranging response (RNG_RSP) and uplink (UL) allocation information (CDMA Allocation IE). However, when many SSs attempt to initiate ranging procedures simultaneously, the SSs have to contend for access to the shared ranging channel. As a result, a ranging collision may occur in a wireless communications system employ conventional CDMA ranging.

Figure 3:
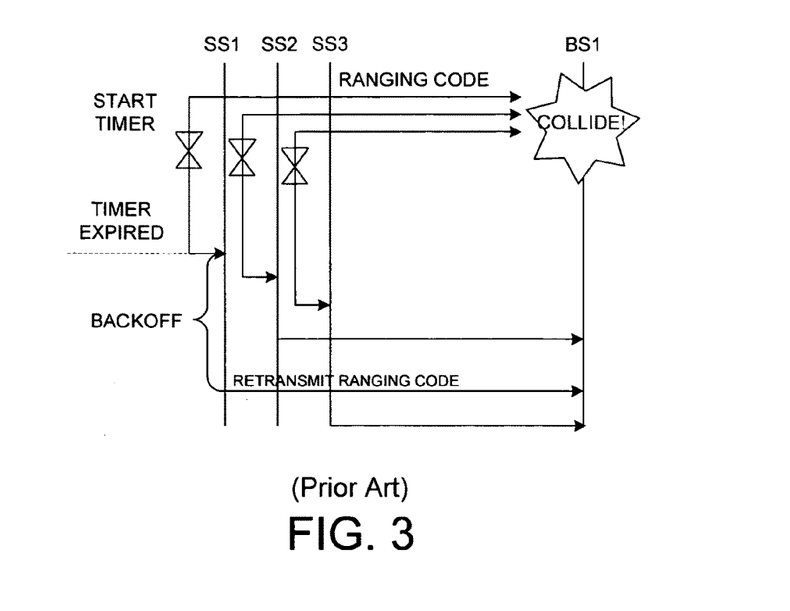
FIGS. 3-5 (Prior Art) illustrate examples of a contention-based CDMA ranging procedure.

FIG. 3 (Prior Art) illustrates an example of a CDMA ranging collision. Subscriber Stations SS1, SS2 and SS3 transmit different ranging codes on the same ranging slot simultaneously. The ranging codes collide and are thus not decodable by the Base Station BS1. As a result, BS1 will not transmit a successful ranging response back to the SSs. In the example of FIG. 3, after sending out an initial ranging code, each SS starts a predefined timer and waits for a ranging response from BS1 until the timer expires. After the timer expires, the SS will wait for a backoff window before retransmitting the ranging code for a next round of contention. Thus, the overall time delay caused by the ranging collision can be calculated based on the following formula:

$$T_{delay} = T_{timer} + T_{backoff} \cdot T_{frame\_length}$$

where $T_{delay}$ is the total delay time, $T_{timer}$ is the timeout value, $T_{backoff}$ is the backoff time, and $T_{frame\_length}$ is the length of a frame.

Figure 4:
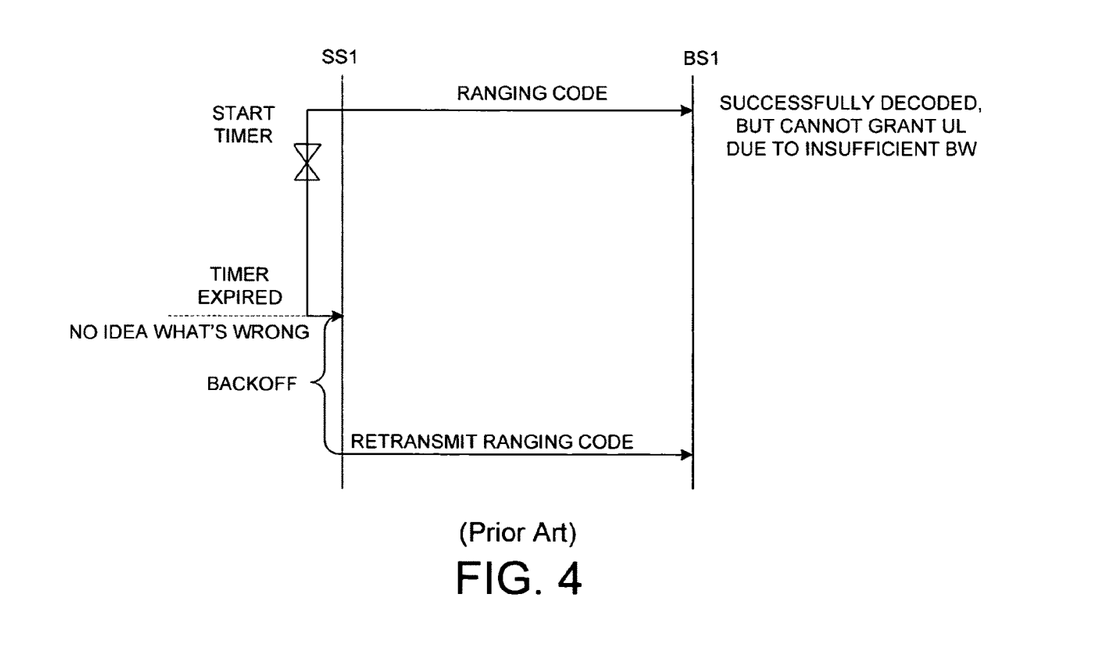

FIG. 4 illustrates another example of a CDMA ranging failure. Subscriber station SS1 transmits an initial ranging code to the Base Station BS1. The ranging code is successfully received and decoded by BS1. Uplink (UL) resource, however, cannot be granted by BS1 due to insufficient bandwidth. Without receiving a successful UL grant, SS1 waits for timer expiration plus a backoff window, and then retransmits the ranging code for a next round of contention. The overall time delay can be calculated based on the following formula:

$$T_{delay} = T_{timer} + T_{backoff} \cdot T_{frame\_length}$$

where $T_{delay}$ is the total delay time, $T_{timer}$ is the timeout value, $T_{backoff}$ is the backoff time, and $T_{frame\_length}$ is the length of a frame.

Figure 5:
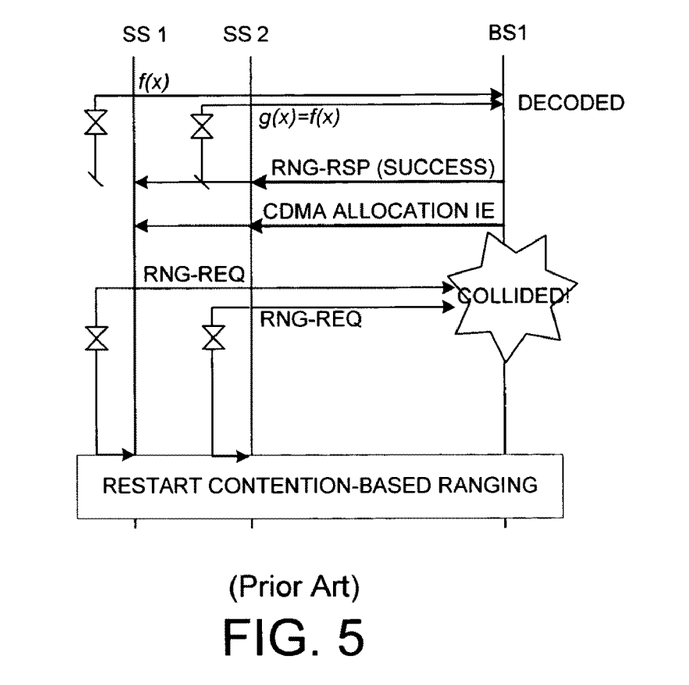

FIG. 5 illustrates a third example of a CDMA ranging procedure. In the example of FIG. 5, two Subscriber Stations SS1 and SS2 transmit the same ranging code on the same ranging slot. Base Station BS1 successfully decodes the ranging code and replies with a ranging response (RNG_RSP with ranging status=success) and a CDMA Allocation IE to both SS1 and SS2. When SS1 and SS2 receive the response from BS1, each SS sends a subsequent ranging request message simultaneously. As a result, the ranging request messages collide and the SSs no longer receive any response from BS1 until expiration of timer. The overall time delay can be calculated by the formula below:

$$E[T_{delay}] = 1.5 T_{timer} + (T_{backoff} + 1) \cdot T_{frame\_length}$$

where $T_{delay}$ is the total delay time, $T_{timer}$ is the timeout value, $T_{backoff}$ is the backoff time, and $T_{frame\_length}$ is the length of a frame.

Figure 6:
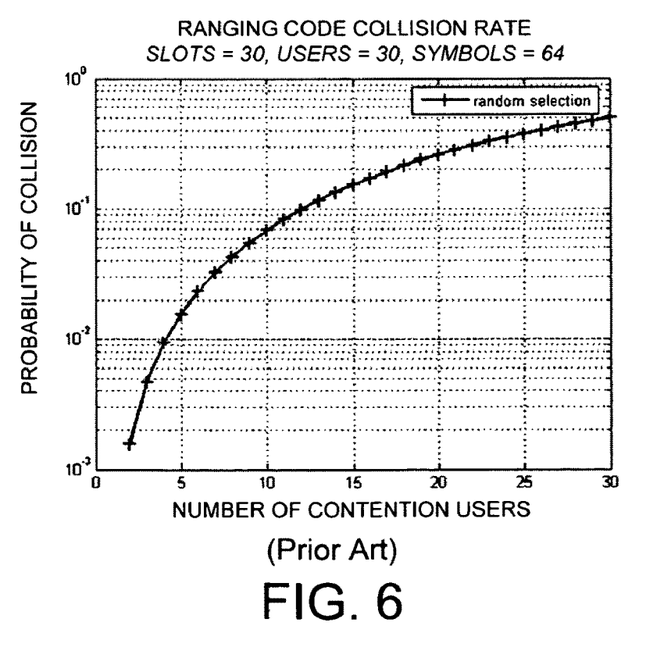
FIG. 6 (Prior Art) is a diagram of the probability of at least two users select the same code and the same slot for ranging.

FIG. 6 illustrates a diagram of the probability ($P_{collision}$) of at least two users select the same code and the same slot. In the example of FIG. 6, the total number of users is thirty, the number of available ranging codes is sixty-four, and the number of available ranging slots is thirty. As the number of users increases, $P_{collision}$ also increases. When the number of user approaches thirty, $P_{collision}$ is very close to one. $P_{collision}$ can be expressed by the formula below:

$$P_{collision} = 1 - \frac{\prod_{i=0}^{Nu-1}(NcNs - i)}{(NcNs)^{Nu}}$$

$$P_{collision} = 1 - \frac{\prod_{i=0}^{Nu-1}(NcNs - i)}{(NcNs)^{Nu}}$$

where Nu is the total number of users, Nc is the number of available ranging codes, and Ns is the number of available ranging slots.

If a large amount of collisions are caused by the contention access, then it becomes difficult for any of the SSs to complete its ranging procedure. Therefore, excessive time is needed for all the SSs to restart their ranging procedures, and much bandwidth on the shared ranging channel is wasted. The total latency introduced by ranging collision can be expressed by:

$$T_{total\_delay} = \sum_{i=1}^{R} T_{delay_i}$$

where $T_{delay}$ is the delay time for each SS, which depends on $T_{timer}$, $T_{backoff}$, and $T_{frame\_length}$. In an IEEE 802.16e system, $T_{timer}$ ranges from 60 ms to 200 ms, $T_{backoff}$ ranges from $2^0$ to $2^{15}$ frames and $T_{frame\_length}$ is equal to 5 ms. Thus, it is possibly to take more than one second to complete the ranging procedure.

In a next generation 4G system, the maximum interruption time is 30 ms for intra-frequency handover and 100 ms for inter-frequency handover. Therefore, the latency introduced by ranging collision needs to be reduced in order to meet the requirements of 4G systems. Various efforts have been made to design a more efficient and faster ranging procedure.

Figure 7A:
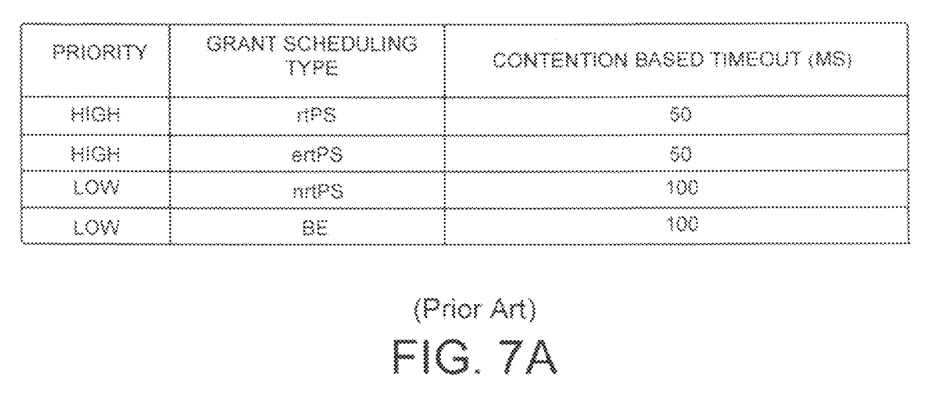
FIG. 7A (Prior Art) illustrates a differentiated random access scheme with different timeout values.

LG Electronics proposed a differentiated random access scheme for contention-based bandwidth request ranging procedure. As shown in FIG. 7A, different timeout values are applied based on the priority of each bandwidth request (BR) indicator. To communicate the different priority and timeout values, a Base Station may broadcast a map of priority and timeout value to all the Subscriber Stations. For example, real-time service (rtPS) and extended real-time service (ertPS) are both high priority services having a shorter timeout value of 50 ms, while non real-time service (nrtPS) and best effort (BE) are low priority services having a longer timeout value of 100 ms.

Figure 7B:
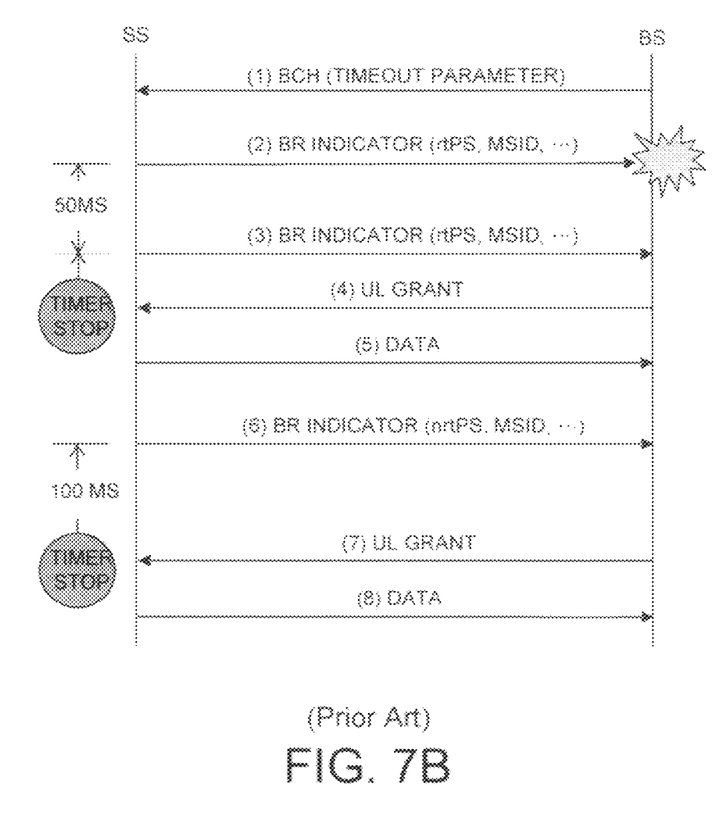
FIG. 7B (Prior Art) illustrates a differentiated bandwidth request ranging procedure.

FIG. 7B is a message sequence diagram of a differentiated bandwidth request ranging procedure proposed by LG Electronics. As illustrated in FIG. 7B, high priority services such as rtPS have a shorter timeout and thus a shorter delay while low priority services such as nrtPS have a longer timeout and thus a longer delay. During this ranging procedure, however, the SS still waits for timer expiration while contention resolution remains unhandled. Furthermore, such differentiated random access scheme is not applicable to random access channels of equal opportunity such as the ranging channel for initial ranging.

SUMMARY

A fast feedback mechanism is provided in a contention-based ranging procedure. A Subscriber Station (SS) initializes a ranging procedure by sending a ranging code on a selected ranging opportunity for resource access to a Base Station (BS) on a shared ranging channel in a previous uplink frame. The SS also starts a timer associated with the ranging code. In response to all received ranging opportunities, the BS broadcasts an acknowledgement (ACK) in a subsequent downlink frame. The ACK comprises a reception status message that indicates the decoding status of the ranging opportunities. With the novel fast feedback mechanism, when ranging collision or failure occurs, upon receiving the reception status report, the SS will proceed with the next round of contention without continuing wait for the entire timeout period. As a result, the total latency due to the ranging collision or failure is reduced.

In one embodiment, the SS initiates an initial or periodic ranging procedure by transmitting an initial ranging code or a periodic ranging code to the BS. The BS broadcasts an ACK followed by a ranging response if the ranging code is successfully decoded and an uplink grant for ranging request message. In one example, the ranging response and the UL grant is embedded within the ACK to reduce overhead. When the SS later transmits a ranging request message, the BS optionally transmits a negative acknowledgement (NACK) message if the ranging request message is corrupted.

In another embodiment, the SS initiates a bandwidth request (BR) ranging procedure by transmitting a BR ranging code to the BS. The BS broadcasts an ACK followed by an uplink grant for BR message if the BR ranging code is successfully decoded. In one example, the UL grant is embedded within the ACK to reduce overhead. When the SS later transmits a BR message, the BS optionally transmits a NACK if the BR message is corrupted. Otherwise, the BS transmits an UL grant for data and the SS starts transmitting data using scheduled UL resource.

The broadcasted ACK may be in the format of a bitmap, a type/length/value (TLV) triple, or a standalone MAC management message. In one example, the ACK is in a bitmap format comprising a plurality of bits, and each bit indicates a reception status of each ranging opportunity. In another example, the ACK comprises additional information such as a decodable ranging code that corresponds to each ranging opportunity, a ranging response, and/or a CDMA Allocation IE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 8:
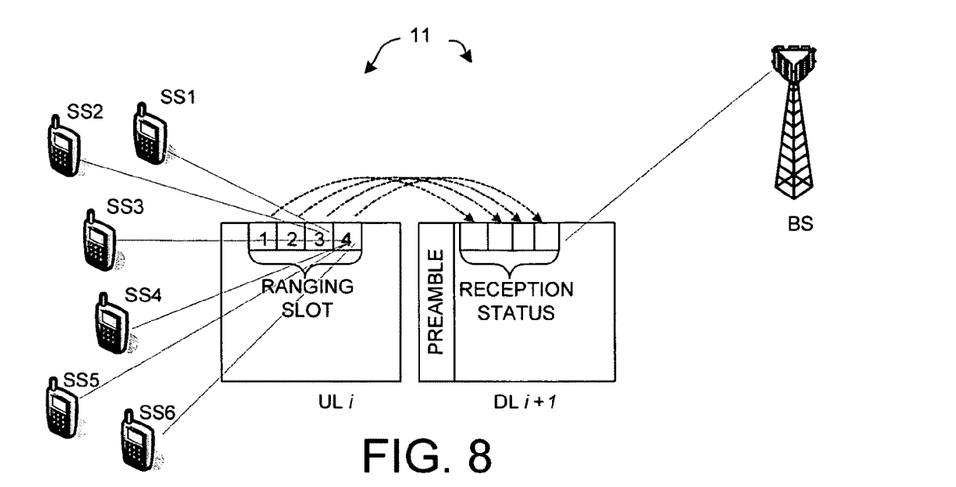
FIG. 8 illustrates a high-level diagram of a fast feedback contention-based CDMA ranging in accordance with a novel aspect.

FIG. 8 illustrates a high-level diagram of a contention-based Code Division Multiple Access (CDMA) ranging with fast feedback in accordance with a novel aspect. Contention-based CDMA ranging is used in IEEE 802.16 wireless communications systems (i.e., wireless communications system 11), where a Subscriber Station (SS) transmits a ranging code to a Base Station (BS) on a shared ranging channel for various purposes. In the example of FIG. 8, each of the SSs (SS1 to SS6) initiates a ranging procedure by transmitting a randomly selected ranging code on a randomly selected ranging opportunity in a previous uplink frame (UL i), while the BS transmits an acknowledgement (ACK) or a reception status report in a subsequent downlink frame (DL i+1) in response to all ranging opportunities received in the previous uplink frame (UL i). A ranging opportunity comprises either one or multiple ranging slots.

If the ranging codes are successfully decoded by the BS, then the BS responds with a ranging response (RNG-RSP) and/or an uplink (UL) grant. Because the BS cannot tell which SS sent the CDMA ranging code, the BS broadcasts the RNG-RSP and/or UL grant that contains the ranging code attributes it receives. The target of the RNG_RSP and/or UL grant is identified by the code attributes, including ranging code index and the position of the ranging opportunity used to transmit the ranging code including a frame number, a time symbol reference and a sub-channel reference.

When many SSs attempt to initiate ranging procedures simultaneously, the SSs have to contend for access to the shared ranging channel. Ranging collision or failure may occur in several scenarios. As illustrated in FIG. 8, in one example, when two users transmit identical ranging code on the same ranging slot (i.e., SS1-SS2 on slot #3), the ranging code may still be decodable but the users are undistinguishable. This is so-called capture effect. In another example, when too many ranging codes are conveyed by a single ranging slot (i.e., SS3-SS6 on slot #4), the ranging codes may not be decodable due to low SNR caused by noise spreading or frequency-selective fading in the multi-carrier environment. Typically, such ranging collision or failure would introduce latency because the SSs have to retransmit the ranging codes for next round of contention. Such latency, however, is reduced by employing a novel fast feedback scheme where the BS broadcasts an ACK or a reception status report back to each SS immediately after the detection of the ranging collision or failure.

Figure 9:
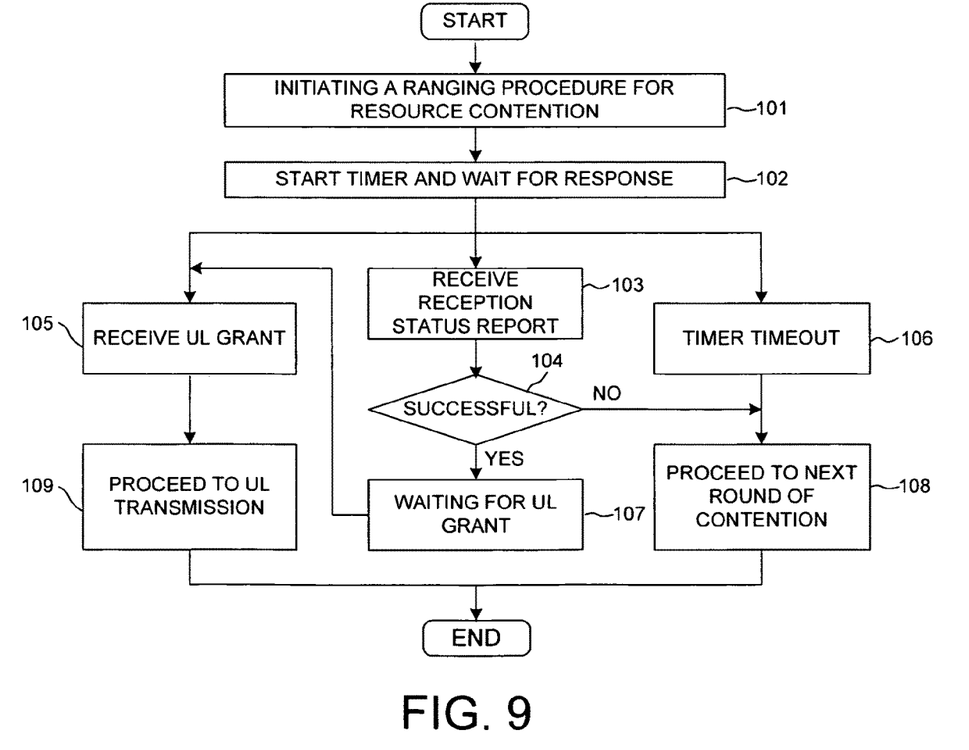
FIG. 9 is a flow chart of a method of a fast feedback contention-based CDMA ranging procedure in accordance with a novel aspect.

FIG. 9 is a flow chart of a method of fast feedback contention-based CDMA ranging procedure in accordance with a novel aspect. In step 101, a Subscriber Station (SS) initializes a ranging procedure by sending a request to a Base Station (BS) for ranging opportunities. In step 102, the SS starts a pre-defined timer and then begins to wait for a response from the BS. In step 103, the SS receives a reception status report for the requested ranging opportunities from the BS. In step 104, the SS determines whether the decoding of its request is successful based on the received status report. If the request is not successfully decoded, then the SS will continue with step 108 to proceed with the next round of contention; otherwise, it will go on with step 107 to wait for uplink (UL) grant. In step 105, the SS receives a UL grant from the BS, and then proceeds with the UL transmission in step 109. If the SS has not gotten any response from the BS until the pre-defined timer is expired (step 106), then it will continue with step 108 for the next round of contention.

In one novel aspect, a fast feedback mechanism is provided to reduce latency caused by possible ranging collision or failure. Typically, after initiating a ranging procedure, each SS starts a predefined timer and waits for a response or UL grant from the BS until the timer expires. With the novel fast feedback mechanism, however, when ranging collision or failure occurs, upon receiving the ACK or reception status report in step 103, the SS will continue with step 108 to proceed with the next round of contention without continuing to wait for the entire timeout period. As a result, the total latency due to the ranging collision or failure is reduced.

Figure 10:
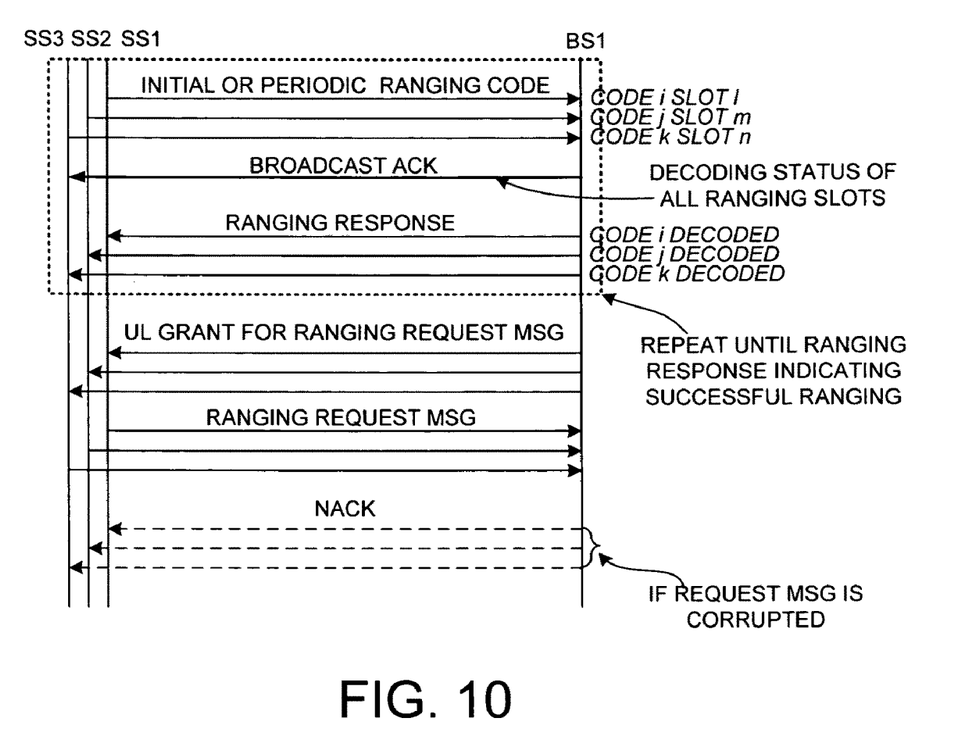
FIG. 10 is a message sequence chart of an initial or periodic ranging procedure with fast feedback in accordance with one novel aspect.

Ranging procedures are categorized into initial ranging, periodic ranging, and bandwidth request ranging. FIG. 10 illustrates a message sequence chart of an initial or periodic ranging procedure in accordance with one novel aspect. In the example of FIG. 10, there are three contention users (SS1, SS2, and SS3) and one base station BS1. Each SS first transmits a randomly selected initial or periodic ranging code to BS1 using a randomly selected ranging slot in a previous UL frame. SS1 transmits ranging code i on ranging slot 1, SS2 transmits ranging code j on ranging slot m, and SS3 transmits ranging code k on ranging slot n. After receives all the ranging codes, BS1 then broadcasts an acknowledgement (ACK) back to all the SSs in a subsequent DL frame. The ACK comprises decoding status of all the received ranging slots. If a ranging code is successfully decoded and no physical layer parameters updating is required, then a ranging response (RNG_RSP) is sent back to the corresponding SS indicating that the uplink channel is synchronized and that the SS is able to send subsequent MAC management messages. Otherwise, the SS may retransmit the ranging code until it receives a RNG_RSP from BS1. After sending the RNG_RSPs, BS1 also sends an UL grant to each SS for ranging request (RNG_REQ) messages. Each SS receives the UL grant and transmits a RNG_REQ message to update remaining system parameters (e.g., security context). If the RNG_REQ messages are corrupted, then BS1 may optionally send a NACK back to the SSs. Otherwise, if BS1 replies with a RNG_RSP in response to the RNG_REQ message, then the initial or periodic ranging procedure is successfully completed.

Figure 11:
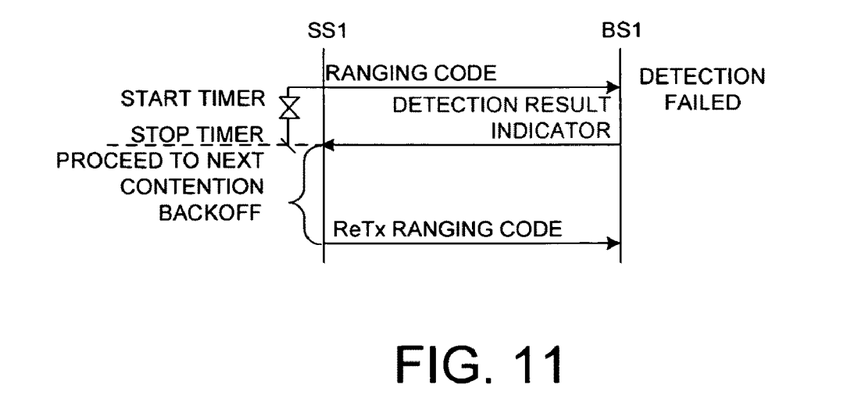
FIG. 11 illustrates a fast feedback mechanism for a failed detection of ranging code in accordance with the present invention.

FIG. 11 illustrates a fast feedback mechanism for a failed detection of a ranging code in accordance with the present invention. In the example of FIG. 11, SS1 transmits a ranging code to BS1 and starts a timer in association with the ranging code. BS1 fails to detect the ranging code due to ranging collision. In one novel aspect, a fast feedback status report of previous ranging opportunities is provided to SS1 from BS1 by broadcasting a detection result indicator. Upon reception of the detection result indicator, SS1 can stop its timer and proceed to the next contention (e.g. retransmit the ranging code) immediately if its previous ranging was reported as failed. As a result, SS1 is informed the ranging failure before timer expiration. This prevents SS1 from waiting for the entire timeout period and reduces the overall delay of the contention.

Figure 12:
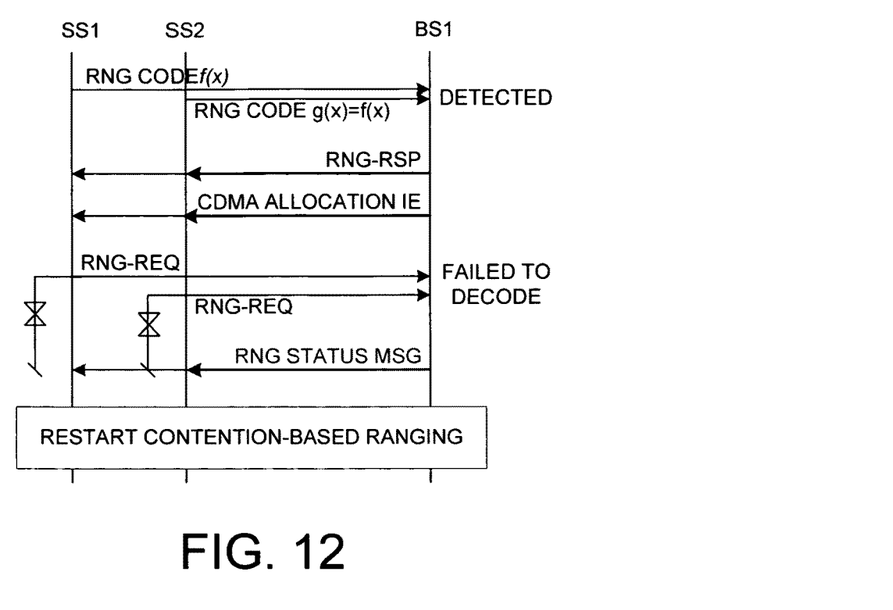
FIG. 12 illustrates a fast feedback mechanism for a detection of collision of ranging request messages in accordance with the present invention.

FIG. 12 illustrates a fast feedback mechanism for a detection of collision of ranging request (RNG_REQ) messages in accordance with the present invention. In the example of FIG. 12, SS1 and SS2 simultaneously transmit a ranging code f(x) and g(x) to BS1, respectively. Coincidently, code f(x) is the same as g(x). Upon successfully detects the received ranging code, BS1 broadcasts a ranging response (RNG_RSP) and a CDMA Allocation IE back to SS1 and SS2. SS1 and SS2 then transmit RNG_REQ messages to BS1 simultaneously and start their timers. BS1, however, failed to decode the received RNG_REQ messages due to collision. In one novel aspect, a fast feedback status is provided to SS1 and SS2 from BS1 by broadcasting a ranging status report reporting the RNG_REQ message collision. Upon reception of the ranging status report, SS1 and SS2 can stop their timers and proceed to the next round of contention immediately. As a result, SS1 and SS2 are informed the ranging failure before timer expiration. This prevents SS1 and SS2 from waiting for the entire timeout period and reduces the overall delay of the contention process.

The fast feedback mechanism illustrated above requires the broadcast of an extra ACK/status message from a BS to SSs. Extra overhead is thus introduced by the proposed fast feedback mechanism. Moreover, the extra status message may cause incompatibility with newer SSs and the legacy SSs that do not support fast feedback functionality. These two issues can be effectively avoided by piggybacking the status message in a subsequent downlink broadcast message from the BS to the SSs.

Figure 13:
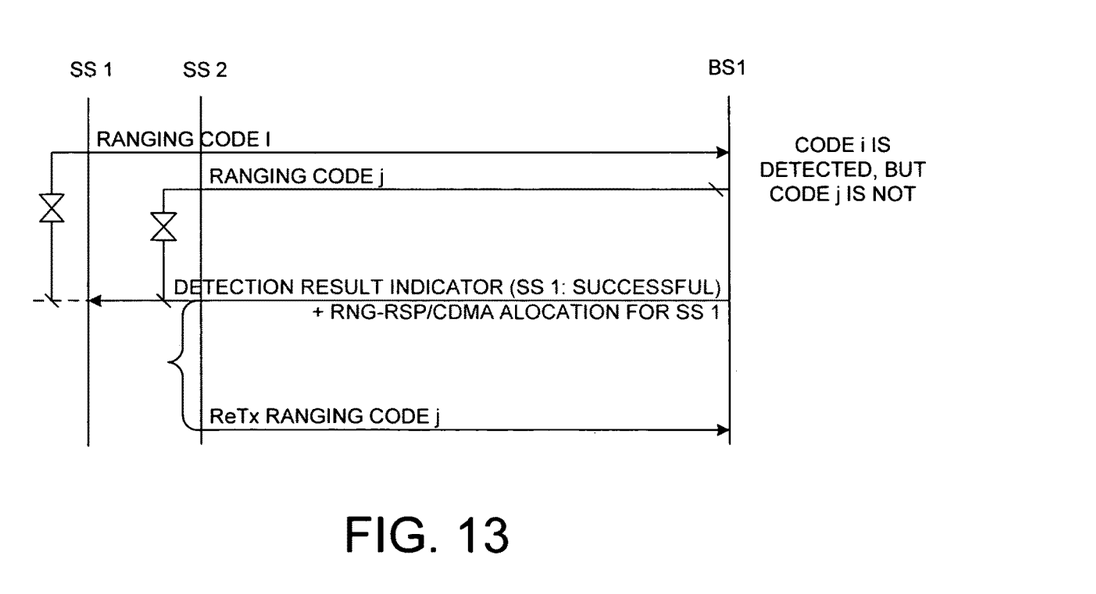
FIG. 13 illustrates a more efficient fast feedback mechanism through piggybacking a ranging response in a detection result indicator in accordance with the present invention.

FIG. 13 illustrates a more efficient fast feedback mechanism through piggybacking a ranging response/CDMA Allocation parameters in a detection result indicator IE in accordance with the present invention. As illustrated in FIG. 13, SS1 transmits a ranging code #i on a randomly selected ranging opportunity m to BS1, while SS2 transmits a ranging code #j on a randomly selected ranging opportunity n to BS1 at the same time. BS1 detects ranging code #i in ranging opportunity m, but does not detect ranging code #j in ranging opportunity n. BS1 then broadcasts a detection result indicator IE in a subsequent frame in response to the successful detection of ranging opportunity m and the code index of ranging code #i. In the meantime, a RNG_RSP/CDMA Allocation parameters for SS1 are piggybacked in the IE. The detection result indicator reports failure of ranging opportunity n so SS2 retransmits the ranging code #j without waiting for a full timeout period. By the piggybacking mechanism, no extra message is required during the initial ranging procedure.

Figure 14:
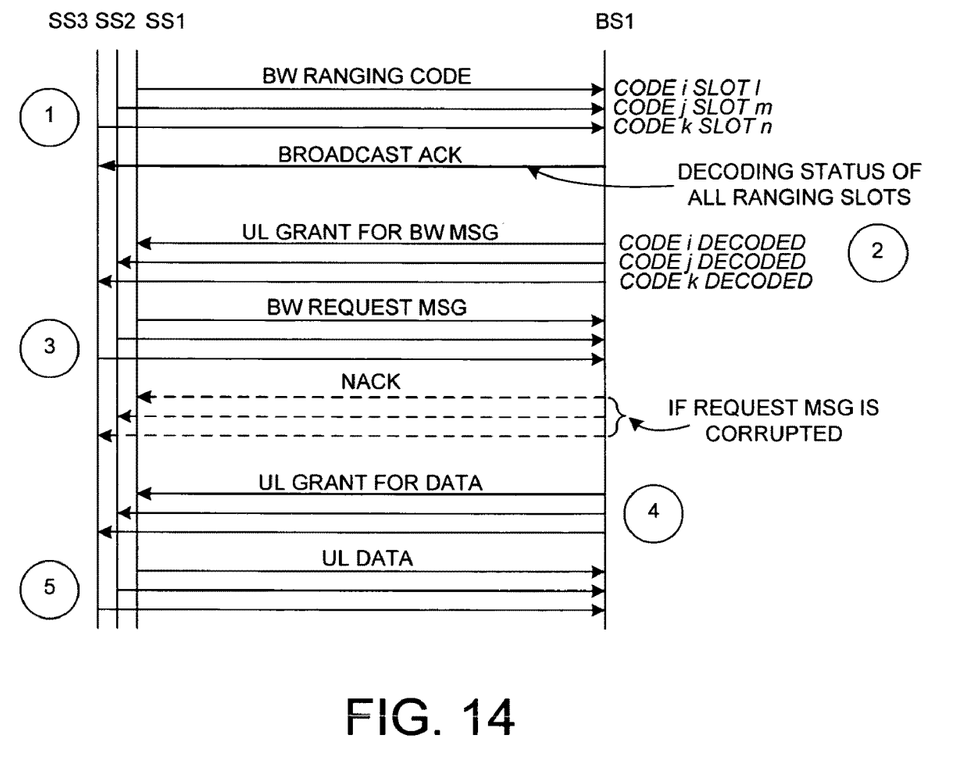
FIG. 14 is a message sequence chart of a bandwidth request ranging procedure with fast feedback in accordance with one novel aspect.

FIG. 14 illustrates a message sequence chart of a bandwidth (BW) request ranging procedure in accordance with one novel aspect. As illustrated in FIG. 14, an IEEE 802.16 compliant wireless system employs a five-step regular BW request ranging procedure. To start a BW request ranging procedure, each SS transmits a randomly selected BW ranging code to BS1 using a randomly selected ranging slot in a previous UL frame (step 1). In the example of FIG. 14, SS1 transmits ranging code i on ranging slot 1, SS2 transmits ranging code j on ranging slot m, and SS3 transmits ranging code k on ranging slot n. After receives all the ranging codes, BS1 then broadcasts an acknowledgement (ACK) back to all the SSs in a subsequent DL frame. The ACK comprises decoding status of all the received ranging slots. If a BW request ranging code is successfully decoded, then an UL grant for BW request message is sent back to the corresponding SS (step 2). After received the UL grant for BW request message, each SS transmits a BW request message to BS1 (step 3). If the BW request messages are corrupted, then BS1 may optionally send a NACK back to the SSs. Otherwise, BS1 transmits an UL grant for data back to the SSs (step 4). The BW request ranging is completed and each SS starts to transmit UL data (step 5).

Figure 15:
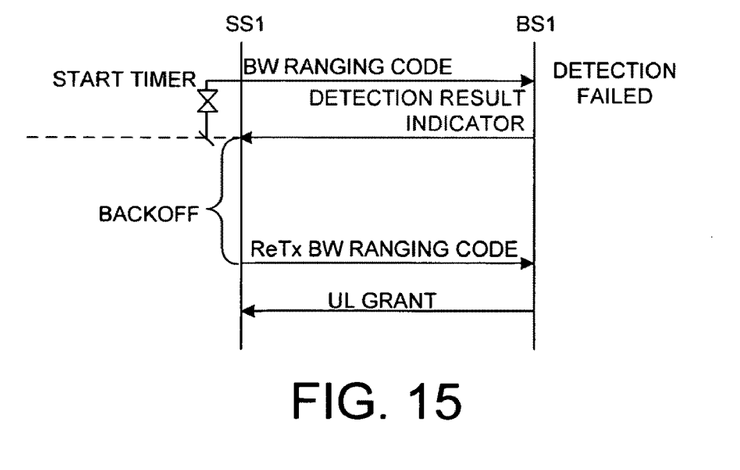
FIG. 15 illustrates a fast feedback mechanism for a failed detection of a bandwidth request indicator in accordance with the present invention.

FIG. 15 illustrates a fast feedback mechanism for a failed detection of a BW request ranging code in accordance with the present invention. As illustrated in FIG. 15, SS1 first transmits a BW request ranging code to BS1 and starts a timer. BS1, however, fails to detect the BW request ranging code transmitted from SS1. In one novel aspect, a fast feedback mechanism is provided by broadcasting a detection result indicator indicating such failed detection. Upon reception of the detection result indicator, SS1 can stop its timer and proceeds to the next round of contention (e.g. retransmit the BW request ranging code) immediately if the previous BW request ranging code was reported failed. Thus SS1 is informed the BW request failure before timer expiration. This prevents SS1 from waiting for the entire timeout time and reduces the overall delay of the contention process.

Figure 16:
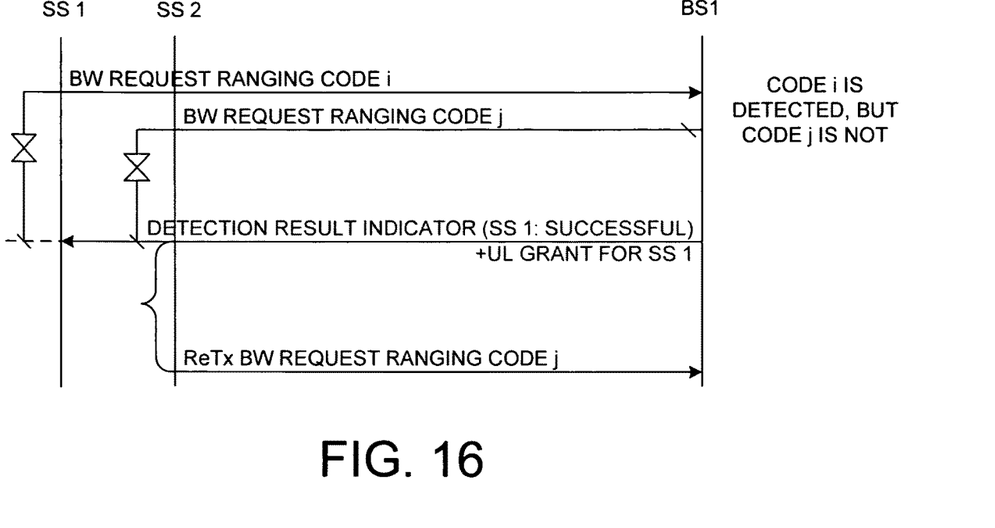
FIG. 16 illustrates a more efficient fast feedback mechanism through piggybacking an uplink grant in a detection result indicator in accordance with the present invention.

FIG. 16 illustrates a more efficient fast feedback mechanism through piggybacking an UL resource grant in a detection result indicator message in accordance with the present invention. As illustrated in FIG. 16, SS1 transmits a BW request ranging code #i on a randomly selected ranging opportunity m to BS1, while SS2 transmits a BW request ranging code #j on a randomly selected ranging opportunity n to BS1 at the same time. BS1 detects BW_REQ ranging code #i successfully, but fails to detect BW_REQ ranging code #j. BS1 then broadcasts the detection result indicator message in a subsequent frame to indicate the decoding status of the ranging opportunity m and the index of the decoded code (ranging code #i), and the message also carries an UL grant for SS1 in response to the successful detection of BW_REQ ranging code #i. Because BW_REQ #j is not successfully detected, the detection result indicator reports the detection failure status of ranging opportunity n. SS2 then retransmits the BW_REQ ranging code #j without waiting for a full timeout period. By piggybacking the subsequent UL grant to the detection result indicator message, no extra message is required during the BW request ranging procedure.

Figure 17:
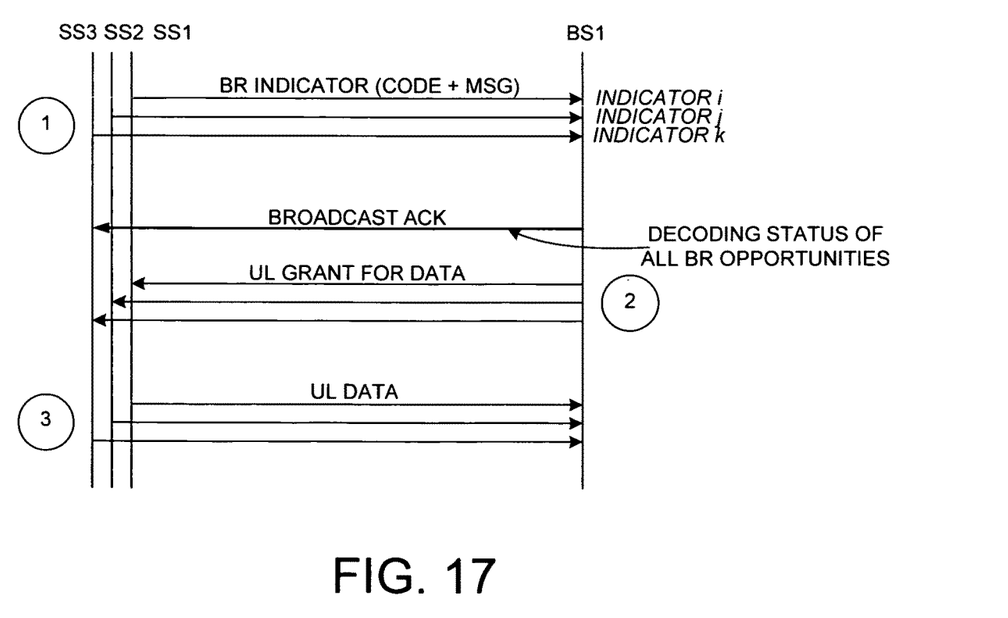
FIG. 17 illustrates a quick access bandwidth request ranging procedure with fast feedback in accordance with one novel aspect.

FIG. 17 illustrates a quick access BW request ranging procedure with fast feedback in accordance with a preferred embodiment of the present invention. As illustrated in FIG. 17, an IEEE 802.16m compliant wireless system also employs a three-step quick access BW request ranging procedure. To start a quick access BW request ranging procedure, each SS transmits a randomly selected BW request (BR) indicator to BS1 using a randomly selected BR opportunity (step 1). A BR indicator may include both a BW ranging code and a BW request message. In the example of FIG. 17, SS1 transmits BR indicator #i on BR opportunity 1, SS2 transmits BR indicator #j on BR opportunity m, and SS3 transmits BR indicator #k on BR opportunity n. After receives all the BR indicators, BS1 then broadcasts an acknowledgement (ACK) back to all the SSs. The ACK comprises decoding status of all the received ranging opportunities in the previous frame. If both a BW ranging code and a BW request message are successfully decoded, then an UL grant for data is sent back to the corresponding SS (step 2). After received the UL grant for data, the BW request ranging is completed and each SS starts to transmit UL data (step 3).

Figure 18:
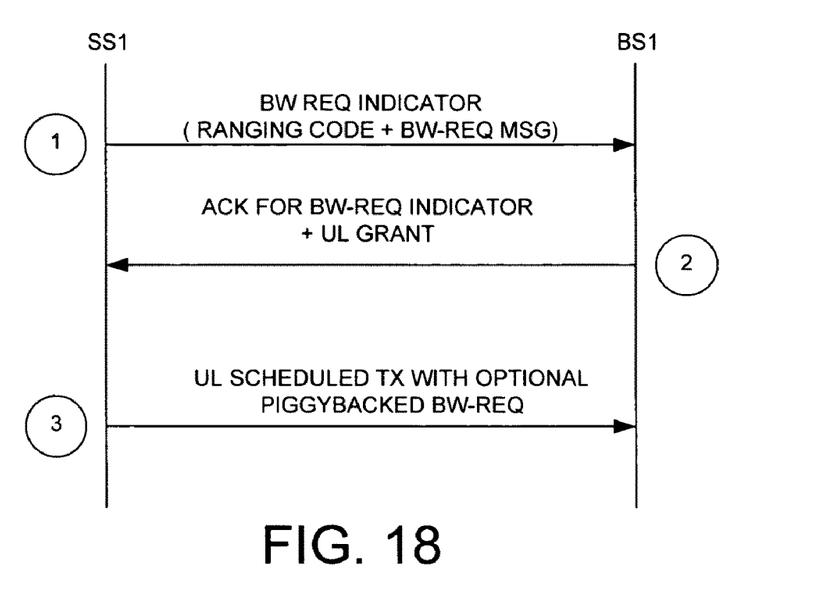
FIG. 18 illustrates a more efficient fast feedback bandwidth ranging procedure in accordance with a preferred embodiment of the present invention.

FIG. 18 illustrates a more efficient quick access bandwidth request ranging procedure with fast feedback in accordance with a preferred embodiment of the present invention. As illustrated in FIG. 18, the UL grant is piggybacked in the subsequent ACK message for all BR indicators. Furthermore, when each SS transmits scheduled UL data, additional BW_REQ messages can optionally be piggybacked in the UL data for further bandwidth request.

Figure 19:
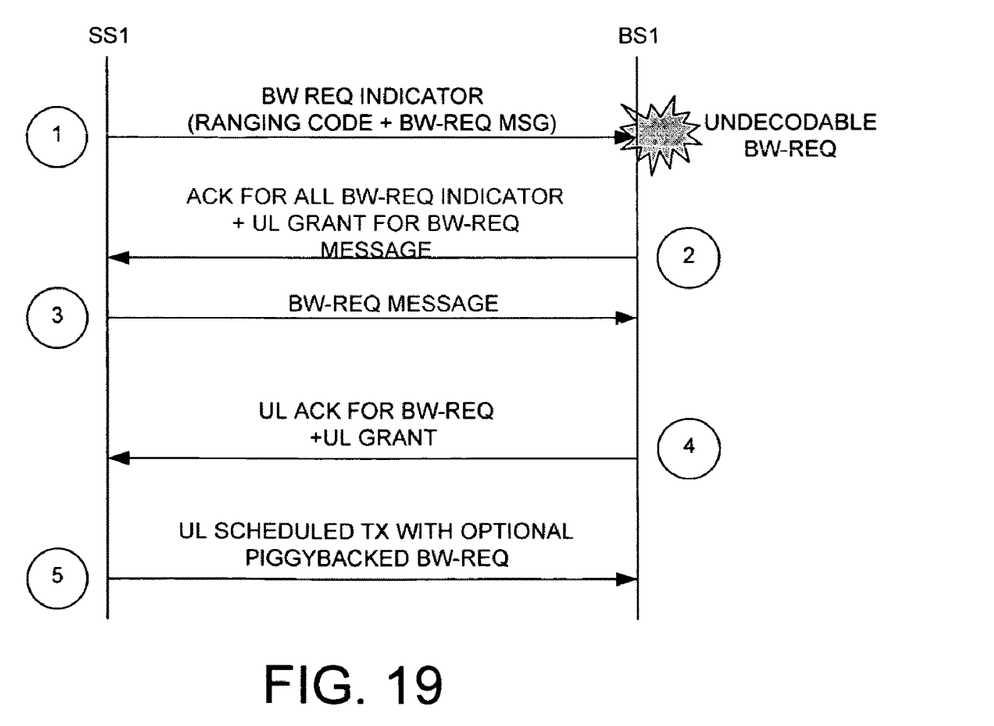
FIG. 19 illustrates a quick access bandwidth ranging procedure with fast feedback while a BW-REQ message is not decodable in accordance with a preferred embodiment of the present invention.

FIG. 19 illustrates a quick access BW request ranging procedure falling back into a normal 5-step BW request ranging procedure when a BW_REQ message is not decodable in accordance with a preferred embodiment of the present invention. As illustrated in FIG. 19, a BR indicator comprising both a BR ranging code and a BR message is transmitted to BS1 in a previous frame (step 1). BS1, however, is not able to decode the BW_REQ message. As a result, BS1 replies ACK to all BR indicators received in the previous frame and an UL grant for SS1 is piggybacked (step 2). SS1 then retransmits a BW_REQ message because of the decoding failure status as reported by the ACK (step 3). In one preferred embodiment, the BS can optionally reply ACK to the BR indicators that are not decoded successfully. BS1 replies ACK to all the BW_REQ messages received in the previous frame and an UL grant for data is piggybacked (step 4). Finally, SS1 transmits its scheduled UL traffic with optionally piggybacked BW_REQ messages (step 5).

Figure 20:
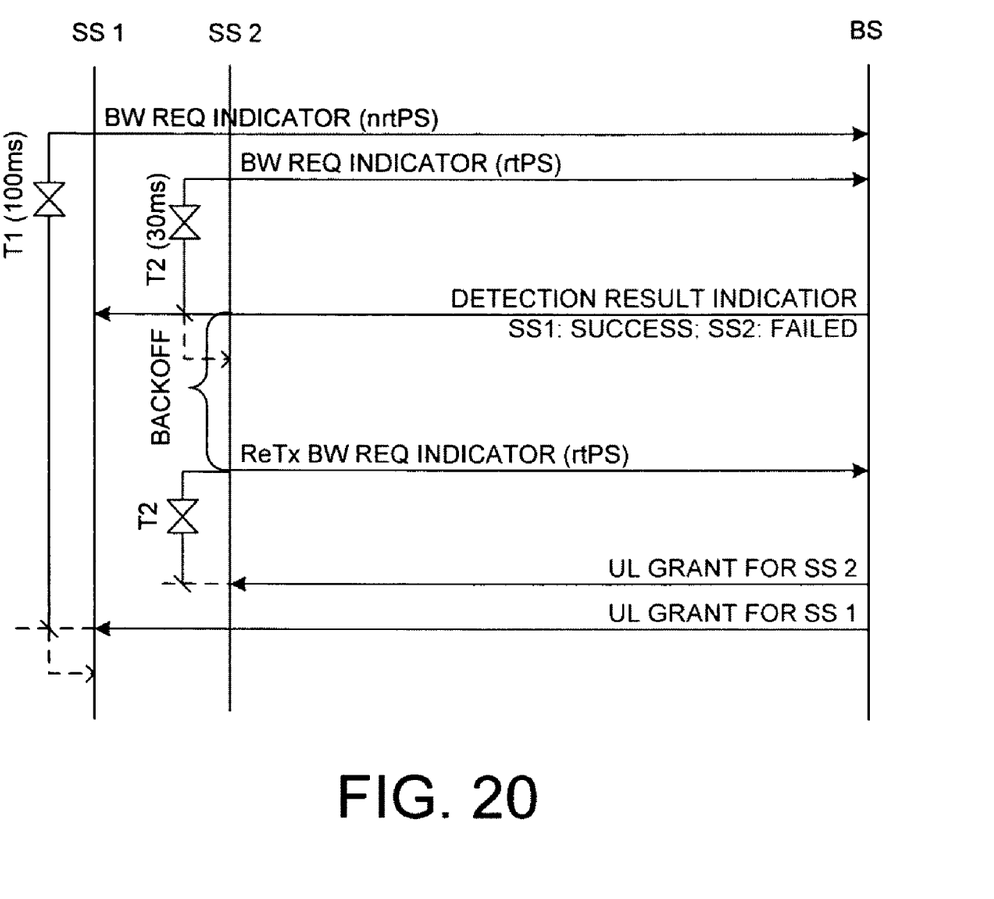
FIG. 20 illustrates a fast feedback bandwidth request ranging procedure while the detection result indicators with different timers in accordance with a preferred embodiment of the present invention.

FIG. 20 illustrates a fast feedback bandwidth request ranging procedure with differentiated timers in accordance with a preferred embodiment of the present invention. The fast feedback mechanism set forth above can also be applied to wireless systems that support different types of services. In the example of FIG. 20, SS2 is a preferred subscriber subscribing realtime service while SS1 is a non-realtime service subscriber. Timeout values of ranging timers for SS1 and SS2 are set to 100 ms and 30 ms respectively. First, SS1 transmits a BR indicator with non-realtime polling service (nrtPS) to BS1, and SS2 transmits a BR indicator with realtime polling service (rtPS) to BS1 for quick access. Next, BS1 broadcasts a detection result indicator in response to all the BR indicators received in the previous frame. The detection result indicator indicates that the BR indicator for SS1 is decoded successfully while the BR indicator for SS2 is failed. Because the BR indicator for SS1 is for nrtPS, it is associated with a longer timeout value of 100 ms. On the other hand, the BR indicator for SS2 is for rtPS, it is associated with a shorter timeout value of 30 ms. Upon receiving the detection result indicator, SS2 immediately stops its timer and retransmits the BR indicator to BS1 after a backoff period. In addition, BS1 sends out an UL grant for SS1 and SS2 with a delay up to the associated timeout value. As a result, SS2 receives its UL grant before SS1 for its higher service priority.

Figure 21:
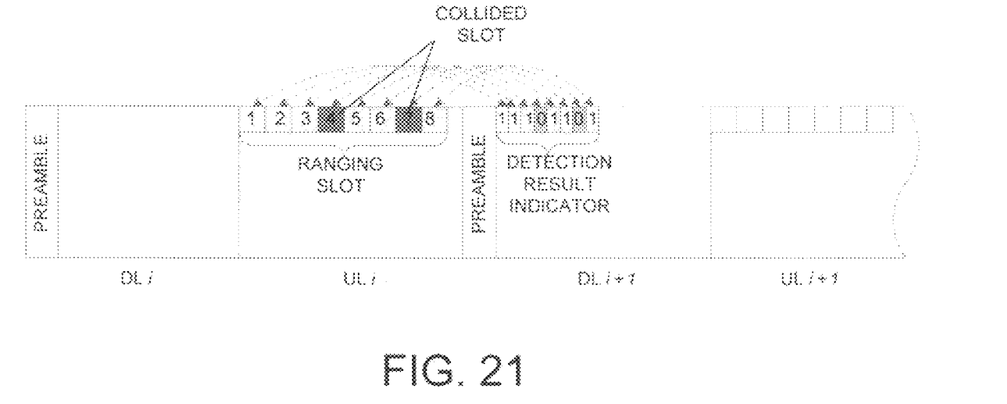
FIG. 21 illustrates a detection result indicator in the form of a bitmap in accordance with a preferred embodiment of the present invention.

FIG. 21 illustrates a detection result indicator in the form of a bitmap in accordance with a preferred embodiment of the present invention. As illustrated in FIG. 21, eight ranging slots (1-8) are used by SSs for ranging procedure in a previous uplink frame (UL i), while the BS responds with an acknowledgement (ACK) or a detection status indicator in a subsequent downlink frame (DL i+1). The detection status indicator is in a bitmap format having eight bits. Each bit is used to indicate a detection status of a corresponding ranging slot. In the example of FIG. 21, ranging codes on ranging slots #4 and #7 are collided and non-decodable, while ranging codes on all other six ranging slots are successfully decoded. In order to indicate such detection result, the $4^{th}$ and the $7^{th}$ bits of the detection result indicator are marked as a digital zero, while the other bits of the detection result indicator are marked as a digital one.

Figure 22:
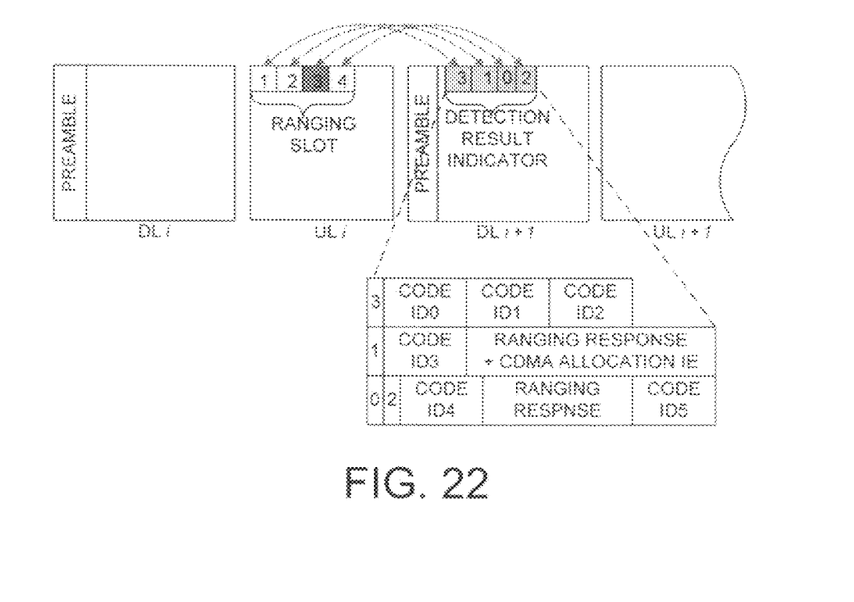
FIG. 22 illustrates a ranging response and CDMA Allocation IE piggybacked in a detection result indicator in accordance with a preferred embodiment of the present invention.

FIG. 22 illustrates another format of a detection result indicator in accordance with a preferred embodiment of the present invention. As illustrated in FIG. 22, four ranging slots (1-4) are used by the SSs for ranging procedure in a previous uplink frame (UL i), while the BS responds with an acknowledgement (ACK) or a detection status indicator in a subsequent downlink frame (DL i+1). The detection result indicator advertises the ranging results for each ranging slot based on the ranging codes received in the previous frame. For slot 1, the message comprises three ranging codes IDs, which indicates the successful decoding of these codes. For slot 2, the message comprises one ranging code ID, which not only advertises the successfully decoded ranging code but also includes additional information such as ranging response and CDMA Allocation IE. For slot 3, none of the ranging code is decoded successfully. For slot 4, the message comprises two ranging codes combined with additional ranging response information.

Although the present invention has been described in connection with certain specific embodiments for instructional purposes, the present invention is not limited thereto. CDMA ranging is used as one embodiment of contention-based access protocol. The invention can be extended to other embodiments of contention-based protocols such as certain media access protocol and collision avoidance/collision detection protocol. A Subscriber Station (SS) may include a mobile station (MS), a mobile terminal (MT), and an advanced mobile station (AMS); and a Base Station (BS) may include an advanced base station (ABS). Furthermore, although the embodiments are specifically made for initial ranging and bandwidth request ranging as examples, it is intended to cover other types of ranging procedure in contention based wireless access, such as handover ranging and periodical ranging. Accordingly, various modifications, adaptations, and combinations of various features of the described embodiments can be practiced without departing from the scope of the invention as set forth in the claims.

What is claimed is:

1. A method, comprising:
   transmitting a ranging code on a ranging opportunity from a mobile station in a previous frame for contention-based resource access in a wireless communications system;
   receiving a first acknowledgement indicating a decoding status of the ranging opportunity from a base station in a subsequent frame, wherein the decoding status of the first acknowledgement comprises a plurality of bits, and wherein each bit indicates a ranging collision or failure status of a corresponding ranging opportunity used by a corresponding mobile station;
   transmitting a request message to the base station after receiving a ranging response corresponding to a successfully decoded ranging code; and
   receiving a second acknowledgement indicating a decoding status of the request message from the base station.

2. The method of claim 1, wherein the first acknowledgement is broadcasted by the base station indicating reception status of ranging opportunities received in the previous frame.

3. The method of claim 1, wherein the second acknowledgement is unicasted from the base station to the mobile station.

4. The method of claim 1, wherein the first acknowledgement further comprises information of the ranging code that corresponds to the ranging opportunity.

5. The method of claim 1, further comprising:
   starting a timer associated with the ranging code; and
   retransmitting the ranging code without expiration of the timer if the first acknowledgement indicates a decoding failure of the ranging opportunity.

6. The method of claim 1, further comprising:
   starting a timer associated with the request message; and retransmitting the request message without expiration of the timer if the second acknowledgment indicates a decoding failure of the request message.

7. The method of claim 1, wherein the ranging code is either an initial ranging code or a periodic ranging code, and wherein the request message is a ranging request message.

8. The method of claim 7, wherein the ranging response is embedded within the first acknowledgement.

9. The method of claim 1, wherein the ranging code is a bandwidth request ranging code, and wherein the request message is a bandwidth request message.

10. The method of claim 9, wherein the mobile station receives an uplink grant for the request message, and wherein the uplink grant for the request message is embedded within the first acknowledgement.

11. The method of claim 9, wherein the mobile station receives an uplink grant for data, and wherein the uplink grant for data is embedded within the second acknowledgement.

12. A method comprising:
transmitting a bandwidth request indicator on a ranging opportunity from a mobile station in a previous frame for contention-based resource access in a wireless communications system, wherein the bandwidth request indicator comprises a bandwidth request ranging code and a bandwidth request message; and
receiving an acknowledgement indicating a decoding status of the ranging opportunity from a base station in a subsequent frame, wherein the decoding status of the acknowledgement comprises a plurality of bits, and wherein each bit indicates a ranging collision or failure status of a corresponding ranging opportunity used by a corresponding mobile station;
retransmitting the bandwidth request message if the acknowledgement indicates that the bandwidth request message is unsuccessfully decoded; and
receiving a second acknowledgement in response to the retransmitted bandwidth request message from the base station.

13. The method of claim 12, wherein the acknowledgement is broadcasted by the base station indicating reception status to ranging opportunities received in the previous frame.

14. The method of claim 12, wherein the acknowledgement further comprises information of the bandwidth ranging code that corresponds to the ranging opportunity.

15. The method of claim 12, wherein the mobile station receives an uplink grant for data if both the bandwidth request ranging code and the bandwidth request message are successfully decoded, and wherein the uplink grant for data is embedded within the acknowledgement.

16. The method of claim 12, further comprising:
starting a timer associated with the bandwidth request indicator; and
retransmitting the bandwidth request indicator without expiration of the timer if the acknowledgement indicates a decoding failure of the ranging opportunity.

17. The method of claim 16, wherein the timer has a predefined timeout period associated with a service type of the bandwidth request indicator.

18. The method of claim 12, wherein the mobile station receives an uplink grant for data, and wherein the uplink grant for data is embedded within the second acknowledgement.

19. A method comprising:
receiving a plurality of ranging codes transmitted by a plurality of mobile stations in a previous frame using a plurality of ranging opportunities in a wireless communications system;
broadcasting a first acknowledgement indicating decoding status of the ranging opportunities received in the previous frame by a base station in a subsequent frame, wherein the decoding status of the first acknowledgement comprises a plurality of bits, and wherein each bit indicates a ranging collision or failure status of a corresponding ranging opportunity;
receiving a request message transmitted by a mobile station after transmitting a ranging response if a ranging code is successfully decoded by the base station; and
unicasting a second acknowledgement indicating a decoding status of the request message to the mobile station.

20. The method of claim 19, wherein the first acknowledgement further comprises information of the ranging code that corresponds to a selected ranging opportunity.

21. The method of claim 19, wherein the ranging code is either an initial ranging code or a periodic ranging code, and wherein the request message is a ranging request message.

22. The method of claim 21, wherein the ranging response is embedded within the first acknowledgement.

23. The method of claim 19, wherein the ranging code is a bandwidth request ranging code, and wherein the request message is a bandwidth request message.

24. The method of claim 23, wherein the base station transmits an uplink grant for the request message, and wherein the uplink grant for the request message is embedded within the first acknowledgement.

25. The method of claim 23, wherein the base station transmits an uplink grant for data, and wherein the uplink grant for data is embedded within the second acknowledgement.

26. A method comprising:
receiving a plurality of bandwidth request indicators transmitted by a plurality of mobile stations in a previous frame using a plurality of ranging opportunities in a wireless communications system, wherein each bandwidth request indicator comprises a bandwidth request ranging code and a bandwidth request message;
broadcasting an acknowledgement indicating decoding status of the ranging opportunities received in the previous frame by a base station in a subsequent frame, wherein the decoding status of the acknowledgement comprises a plurality of bits, and wherein each bit indicates a ranging collision or failure status of a corresponding ranging opportunity;
receiving a retransmission of the bandwidth request message if the acknowledgement indicates that the previously transmitted bandwidth request message is unsuccessfully decoded; and
transmitting a second acknowledgement in response to the retransmitted bandwidth request message from the base station.

27. The method of claim 26, wherein the acknowledgement further comprises information of the bandwidth request ranging code that corresponds to a selected ranging opportunity.

28. The method of claim 26, wherein the base station transmits an uplink grant for data if both the bandwidth request ranging code and the bandwidth request message are successfully decoded, and wherein the uplink grant for data is embedded within the acknowledgement.

29. The method of claim 26, wherein the base station transmits an uplink grant for data, and wherein the uplink grant for data is embedded within the second acknowledgement.

* * * * *